United States Patent [19]
Van Court Carr et al.

[11] Patent Number: 5,633,293

[45] Date of Patent: May 27, 1997

[54] HYDROXY-FUNCTIONAL TRIAMINE CATALYST COMPOSITIONS FOR POLYURETHANE PRODUCTION

[75] Inventors: Richard Van Court Carr, Allentown; Mark L. Listemann, Whitehall; Ann C. L. Savoca, Bernville, all of Pa.

[73] Assignee: Air Products and Chemicals, Inc., Allentown, Pa.

[21] Appl. No.: 565,518

[22] Filed: Nov. 30, 1995

[51] Int. Cl.$^6$ ............... C08J 9/00; C08G 18/00
[52] U.S. Cl. ............... 521/118; 521/172; 528/49; 564/503; 502/167
[58] Field of Search ............... 521/118, 172; 528/49; 564/503; 502/167

[56] References Cited

U.S. PATENT DOCUMENTS

| | | | |
|---|---|---|---|
| 4,026,840 | 5/1977 | Bechara et al. | 260/2.5 AC |
| 4,338,408 | 7/1982 | Zimmerman et al. | 521/115 |
| 4,433,170 | 2/1984 | Zimmerman et al. | 564/508 |
| 4,957,944 | 9/1990 | Schiffauer et al. | 521/115 |
| 5,064,957 | 11/1991 | Nakasugi | 544/86 |
| 5,071,809 | 12/1991 | Casey et al. | 502/155 |
| 5,091,583 | 2/1992 | Casey | 564/461 |

FOREIGN PATENT DOCUMENTS 0469545  5/1992  European Pat. Off. .

OTHER PUBLICATIONS

N. Malwitz, et al. J. Cell. Plastics, 1987, vol. 23, pp. 461–502.

*Primary Examiner*—Rachel Gorr
*Attorney, Agent, or Firm*—Michael Leach; William F. Marsh

[57] ABSTRACT

A method for preparing a polyurethane foam which comprises reacting an organic polyisocyanate and a polyol in the presence of a blowing agent, a cell stabilizer and a catalyst composition consisting essentially of 0–50 mole % compound I and 50–100 mole % compound II:

$$(Me_2NCH_2CH_2)_2N-(CH_2)_n\overset{\overset{R}{|}}{C}HOH \quad \text{I}$$

$$Me_2NCH_2CH_2N(Me)CH_2CH_2N(Me)-(CH_2)_n\overset{\overset{R}{|}}{C}HOH \quad \text{II}$$

wherein
R is hydrogen, a $C_1$–$C_4$ alkly, $C_6$–$C_8$ aryl, or $C_7$–$C_9$ aralkyl group; and
n is 2 to 8.

21 Claims, No Drawings

HYDROXY-FUNCTIONAL TRIAMINE CATALYST COMPOSITIONS FOR POLYURETHANE PRODUCTION

TECHNICAL FIELD

The present invention relates to the use of hydroxyl-containing tertiary amines as catalysts for producing polyurethanes.

BACKGROUND OF THE INVENTION

Polyurethane foams are widely known and used in automotive, housing and other industries. Such foams are produced by reaction of a polyisocyanate with a polyol in the presence of various additives. One such additive is a chlorofluorocarbon (CFC) blowing agent which vaporizes as a result of the reaction exotherm, causing the polymerizing mass to form a foam. The discovery that CFC's deplete ozone in the stratosphere has resulted in mandates diminishing CFC use. Production of water-blown foams, in which blowing is performed with $CO_2$ generated by the reaction of water with the polyisocyanate, has therefore become increasingly important. Tertiary amine catalysts are typically used to accelerate blowing (reaction of water with isocyanate to generate $CO_2$) and gelling (reaction of polyol with isocyanate).

The ability of the tertiary amine catalyst to selectively promote either blowing or gelling is an important consideration in selecting a catalyst for the production of a particular polyurethane foam. If a catalyst promotes the blowing reaction to a too high degree, much of the $CO_2$ will be evolved before sufficient reaction of isocyanate with polyol has occurred, and the $CO_2$ will bubble out of the formulation, resulting in collapse of the foam. A foam of poor quality will be produced. In contrast, if a catalyst too strongly promotes the gelling reaction, a substantial portion of the $CO_2$ will be evolved after a significant degree of polymerization has occurred. Again, a poor quality foam, this time characterized by high density, broken or poorly defined cells, or other undesirable features, will be produced.

Tertiary amine catalysts generally are malodorous and offensive and many have high volatility due to low molecular weight. Release of tertiary amines during foam processing may present significant safety and toxicity problems, and release of residual amines from consumer products is generally undesirable.

Amine catalysts which contain primary and/or secondary hydroxyl functionality typically have limited volatility and low odor when compared to related structures which lack this functionality. Furthermore, catalysts which contain hydroxyl functionality chemically bond into the urethane during the reaction and are not released from the finished product. Catalyst structures which embody this concept are typically of low to moderate activity and promote both the blowing (water-isocyanate) and the gelling (polyol-isocyanate) reactions to varying extents. Examples of such structures are included in the following references: U.S. Pat. Nos. 4,957,944; 5,071,809 and 5,091,583.

Secondary alcohols are preferred in the structures, because these catalysts exhibit a desirable balance between their promotion of the active hydrogen-isocyanate reactions and their own reactivity with isocyanates. In contrast, catalysts which contain primary alcohols react rapidly with isocyanates and thus high use levels are required. Catalysts which contain tertiary hydroxyls react slowly with isocyanates, but the urethanes of tertiary hydroxyls which are formed have poor thermal stability. These urethanes may degrade and release the catalyst at temperatures substantially below the decomposition temperature of the foam itself. The free amine could then accelerate foam decomposition.

A catalyst which strongly promotes the water-isocyanate (blowing) reaction is advantageous for the manufacture of many polyurethane foams. Such catalysts include the β-(N, N-dimethylamino)alkyl ethers, in particular bis(dimethylamino)ethyl ether. Low odor, reactive catalysts structurally related to bis(dimethylamino)ethyl ether are described in U.S. Pat. Nos. 4,338,408 and 4,433,170. In particular, 2-[N-(dimethylaminoethoxyethyl)-N-methylamino]ethanol, Texacat® ZF-10 catalyst, is an effective blowing catalyst, albeit less effective than bis(dimethylamino)ethyl ether.

Copending application Ser. No. 08/198,925 filed Feb. 18, 1994 discloses the use of a catalyst composition consisting essentially of a compound selected from the group consisting of compounds of the following formula

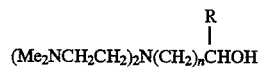

wherein

R is hydrogen, a $C_1$–$C_4$ alkyl, $C_6$–$C_8$ aryl, or $C_7$–$C_9$ aralkyl group; and n is 1 to 8.

U.S. Pat. No. 4,026,840 discloses that the reaction of isocyanate with polyols to form polyurethanes and their polymerization to polyisocyanurates are promoted by certain hydroxyalkyl tertiary amine catalysts corresponding to the formula:

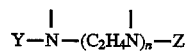

wherein

Y is $CH_3$ or Z,

Z is —$CH_2CH_2OH$, and n is 1 or 2.

EP 0 469 545 A2 (U.S. Pat. No. 5,229,430) discloses an amine catalyst for producing polyurethane comprising a compound of the general formula:

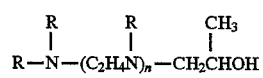

wherein

R's independently are alkyl groups having 1 to 3 carbon atoms, and n is an integer from 0 to 3.

The amine catalyst has a secondary hydroxyl group in the molecule and is claimed to be non-bleeding in the polyurethane resin.

Alkylene oxide adducts of polyamines are also used as polyols for the production of polyurethanes.

U.S. Pat. No. 5,064,957 discloses the hexakis propylene oxide adduct of tris(2-aminoethyl)amine as a precursor to the morpholine-containing polyurethane catalyst, but the propylene oxide adduct itself is not noted as having catalytic activity.

N. Malwitz, et al, *J. Cell. Plastics*, 1987, vol 23, pp 461–502, compared $Me_2NCH_2CH_2N(Me)CH_2CH_2OH$ and $Me_2NCH_2CH_2N(Me)CH_2CH_2CH_2OH$ and found that the hydroxypropyl group shifted the selectivity toward gelling.

SUMMARY OF THE INVENTION

The present invention provides a composition for catalyzing the trimerization of an isocyanate and the reaction between an isocyanate and a compound containing a reactive hydrogen, e.g., the blowing reaction and the urethane reaction for making polyurethane. The catalyst composition consists essentially of compounds having the following formulas I and II:

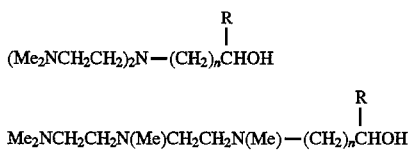

$$(Me_2NCH_2CH_2)_2N-(CH_2)_nCHOH \quad\quad\quad\quad \text{R} \atop | \quad\quad\quad\quad I$$

$$Me_2NCH_2CH_2N(Me)CH_2CH_2N(Me)-(CH_2)_nCHOH \quad\quad \text{R} \atop | \quad\quad II$$

wherein

R in is hydrogen, a $C_1$–$C_4$ alkyl, $C_6$–$C_8$ aryl, or $C_7$–$C_9$ aralkyl group; and n is an integer from 2 to 8.

The composition consists essentially of 0 to 50 mole % compound I and 50 to 100 mole % compound II.

The advantage of these catalysts is that activities and selectivities are variable and they vary in a systematic fashion. Blowing selectivity increases as the number of carbon atoms between the hydroxyl group and the nitrogen increases, allowing the catalyst characteristics to be more easily optimized for a specific application. Mixtures of I and II are significantly more active than mixtures containing the hydroxypropyl derivatives (n=1; R=Me). Whereas the art suggests that variation of the activity of functional tertiary amine catalysts can be achieved by diminishing alcohol reactivity or by increasing the number of tertiary nitrogen atoms in the catalyst, an alteration in catalyst performance based on the separation of hydroxyl group and tertiary nitrogen has not been previously appreciated.

DETAILED DESCRIPTION OF THE INVENTION

The catalyst compositions according to the invention can catalyze (1) the reaction between an isocyanate functionality and an active hydrogen-containing compound, i.e. an alcohol, a polyol, an amine or water, especially the urethane (gelling) reaction of polyol hydroxyls with isocyanate to make polyurethanes and the blowing reaction of water with isocyanate to release carbon dioxide for making foamed polyurethanes, and/or (2) the trimerization of the isocyanate functionality to form polyisocyanurates.

The polyurethane products are prepared using any suitable organic polyisocyanates well known in the art including, for example, hexamethylene diisocyanate, phenylene diisocyanate, toluene diisocyanate ("TDI") and 4,4'-diphenylmethane diisocyanate ("MDI"). Especially suitable are the 2,4- and 2,6-TDI's individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanate and a polyether or polyester polyol.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

Other typical agents found in the polyurethane foam formulations include chain extenders such as ethylene glycol and butanediol; crosslinkers such as diethanolamine, diisopropanolamine, triethanolamine and tripropanolamine; blowing agents such as water, methylene chloride, trichlorofluoromethane, and the like; and cell stabilizers such as silicones.

A general polyurethane flexible foam formulation having a 1–3 lb/ft$^3$ (16–48 kg/m$^3$) density (e.g., automotive seating) containing a gelling catalyst such as triethylenediamine (TEDA) and a blowing catalyst such as the catalyst composition according to the invention would comprise the following components in parts by weight (pbw):

| Flexible Foam Formulation | pbw |
| --- | --- |
| Polyol | 20–100 |
| Polymer Polyol | 80–0 |
| Silicone Surfactant | 1–2.5 |
| Blowing Agent | 2–4.5 |
| Crosslinker | 0.5–2 |
| Catalyst | 0.5–2 |
| Isocyanate Index | 70–115 |

The blowing catalyst composition consists essentially of 0–50 mole % compound formula I and 50–100 mole % compound formula II.

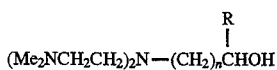

$$(Me_2NCH_2CH_2)_2N-(CH_2)_nCHOH \quad\quad \text{R} \atop | \quad\quad I$$

-continued

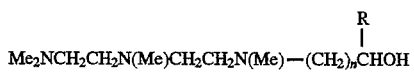

wherein

R, preferably in both formulas, is hydrogen, $C_1$–$C_4$ alkyl, $C_6$–$C_8$ aryl, or $C_7$–$C_9$ aralkyl group and n is 2 to 8; R is preferably hydrogen or an alkyl group, and is especially methyl; n is preferably 2 or 3, especially 3.

Thus the blowing catalyst composition can consist essentially of compound II without any compound I. However, preferred are mixtures consisting essentially of 10–25 mole % compound I and 75–90 mole % compound II, particularly, 15–20 mole% compound I and 80–85 mole % compound II.

Mixtures of compounds represented by formulas I and II are generally prepared in two steps. Step one is the reductive alkylation of diethylenetriamine with a hydroxyaldehyde of formula III:

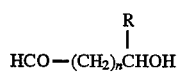

wherein

R is hydrogen, $C_1$–$C_4$ alkyl, $C_6$–$C_8$ aryl, or $C_7$–$C_9$ aralkyl group and n is 1 to 7; R is preferably hydrogen or an alkyl group, and is especially methyl;

n is preferably 1 or 2.

Step two is reductive permethylation with formaldehyde and hydrogen.

Mixtures of compounds represented by formulas I and II can also be prepared by the reductive methylation of diethylenetriamine to afford a mixture of tetramethyldiethylenetriamines represented by formulas IV and V:

followed by reductive alkylation with III.

Alternatively, mixtures of I and II can be prepared by reductive alkylation of diethylenetriamine with VI followed by permethylation.

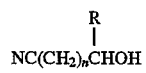

wherein

R is hydrogen, $C_1$–$C_4$ alkyl, $C_6$–$C_8$ aryl, or $C_7$–$C_9$ aralkyl group and n is 1 to 7; R is preferably hydrogen or an alkyl group, and is especially methyl;

n is preferably 1 or 2.

Compound II can be prepared by the sequential tosylation of N,N,N'-trimethyl-N'-(2-hydroxyethyl)ethylenediamine, reaction with monomethylamine to afford triamine V, and reductive alkylation of V with III.

A catalytically effective amount of the catalyst composition is used in the polyurethane formulation. More specifically, suitable amounts of the catalyst composition may range from about 0.01 to 10 parts per 100 parts polyol (phpp) in the polyurethane formulation.

The catalyst composition may be used in combination with other tertiary amine, organotin and carboxylate urethane catalysts well known in the urethane art, both blowing and, particularly, gelling catalysts.

The catalyst compositions of the invention unexpectedly exhibit blowing selectivities which increase as the number of methylene groups between the hydroxyalkylated nitrogen and the hydroxyl group increases. This provides a convenient means of optimizing the catalyst characteristics required for a specific application.

EXAMPLE 1

N,N,N'',N''-Tetramethyldiethylenetriamine (TMDETA)

A 2 L stainless steel autoclave was charged with Raney® 2800 nickel catalyst (28.22 g), water (20.7 g) and N,N-dimethylethylenediamine (DMEDA, 445.9 g, 5.058 mole). The reactor was sealed and pressure checked, and three pressure vent cycles with nitrogen and hydrogen were performed. The reactor was pressured to 500 psi (3447 kPa) with hydrogen and the reaction mixture was heated to 120° C. The hydrogen pressure was increased to 750 psi (5171 kPa) and distilled N,N-dimethylaminoacetonitrile (DMAAcN) was admitted by means of an HPLC pump at a rate of 1.5 mL/min until 415 g (4.933 mole) has been charged in the reactor. The total addition time was 5 hours. Hydrogen uptake continued for 4 hours after the nitrile addition had been completed. GC analysis of the product showed that N,N,N'',N''-tetramethyldiethylenetriamine constituted 20% of the product; the remainder was N,N-dimethylethylenediamine (66%) and other byproducts (12%).

A second run was performed in an analogous fashion except that the reaction pressure was 1200 psi (8274 kPa). Hydrogen uptake stopped as soon as the nitrile addition had been completed. GC analysis showed that reaction product contained 32% N,N,N'',N''-tetramethyldiethylenetriamine (64% selectivity based on DMAAcN), 63% N,N-dimethylethylenediamine, and 1% other byproducts.

The two reaction products (1415 g) were combined in a 3 L round-bottomed flask and distilled through a 40"×1" (102×2.54 cm) id Propack® column. DMEDA and low boiling impurities (837 g) were removed at 20 torr (2.67 kPa) and 49° C. Approximately 150 g were lost through the pump. The remaining material (409 g) was transferred to a 1 L flask and distilled at 100 torr (13.3 kPa). N,N,N'',N''-tetramethyldiethylenetriamine boiled at 128° C. A total of 271 g was collected. The identity of the product was established by $^1$H and $^{13}$C NMR.

EXAMPLE 2

N,N,N'',N''-Tetramethyl-N'-2-hydroxypropyldiethylenetriamine (TMHPDETA)

N,N,N'',N''-Tetramethyldiethylenetriamine (TMDETA, 24.96 g, 157.2 mmole) and propylene oxide (PO, 9.1 g, 157.0 mmole) were charged to a 50 mL autoclave. The reactor was sealed, the contained air was replaced with nitrogen, the reactor was pressured to 100 psi (689 kPa) with nitrogen, and the contents were heated to 120° C. Analysis of samples withdrawn after 6 and 22 hours showed that little change in composition had occurred after the first 6 hours. After 22 hours, the reaction mixture was cooled to ambient temperature and the product was removed. GC analysis of the crude product showed that it contained 4.8% unreacted TMDETA and 82.3% TMHPDETA.

A second run was performed using 14.88 g (93.7 mmole) of TMDETA and 8.28 (142.9 mmole) of PO. GC analysis after 23 hours showed that the reaction mixture contained 10.4% unreacted TMDETA and 82.2% TMHPDETA. The combined crude products were purified by vacuum distillation using a Vigreux column. The unreacted starting amine boiled at 82° C. (0.24 torr; 0.032 kPa); N,N,N'',N''-tetramethyl-N'-(2-hydroxypropyl)diethylenetriamine boiled at 110° C. (0.125 torr; 0.0167 kPa). TMHPDETA was identified by $^1$H and $^{13}$C NMR and mass spectrometry.

EXAMPLE 3

N,N,N'',N''-Tetramethyl-N'-3-hydroxybutyldiethylenetriamine (TMHBDETA)

β-Butyrolactone (5.28 g, 61.4 mmole) was added at a rate of 1.2 mL/hr to a flask containing TMDETA (10.0 g, 65.5 mmole) heated to 100° C. Samples were withdrawn periodically for GC analysis. After 5 hours the concentration of N,N,N'',N''-tetramethyldiethylenetriamine-N'-3-hydroxybutyramide had reached 70%. The reaction was discontinued and the product was isolated by shortpath vacuum distillation (bp 145° C., 0.2 torr; 0.0267 kPa). The amide was identified by GCMS.

Lithium aluminum hydride (26 mL, 1 M solution in THF, 26 mmole) was charged to a nitrogen-purged, oven-dried flask. A solution of the butyramide (6.38 g, 25.9 mmole) in THF (25 mL) was added at a rate of 0.37 mL/min to the LiAlH$_4$ solution heated to 63° C. After the addition was completed, the solution was stirred for an additional 15 minutes and the LiAlH$_4$ was deactivated by successively adding water (1.12 g), 15% NaOH (1.14 g) and water (3.42 g). The resulting solids were removed by vacuum filtration and the amine (1.83 g) was isolated from the filtrate by Kugelrohr distillation at 94° C. and 85 millitorr (0.0113 kPa). TMHBDETA was identified by nuclear magnetic resonance and mass spectrometry.

EXAMPLE 4

N,N,N'',N''-Tetramethyl-N'-4-hydroxyamyldiethylenetriamine (TMHADETA)

TMDETA (10.0 g, 63.0 mmole), γ-valerolactone (63.4 mmole) and titanium (IV) isopropoxide (2.13 g, 7.5 mmole) were weighed into a 100 mL flask. The flask was fitted with a nitrogen inlet, reflux condenser, and thermometer, and the contents were heated to 100° C. Samples removed periodically for GC analysis showed that the reaction was complete after 24 hours. The reaction mixture was cooled and the catalyst was deactivated by adding water (5 mL) and diethyl ether (10 mL) to the reaction vessel. The ether was removed and the amide (3.2 g) was isolated from the resulting solids by Kugelrohr distillation (bp 162° C., 0.4 torr; 0.053 kPa). The product was identified by GCMS.

The amide could also be prepared by the following alternate procedure: TMDETA (37.2 g, 234 mmole) was added dropwise to a flask containing water (6.46 g, 359 mmole) and γ-valerolactone (35.9 g, 359 mmole). The reaction mixture was heated at 100° C. for 18 hours. GC analysis showed that the concentration of amide was no longer changing significantly. The unreacted TMDETA and lactone were removed by short path distillation. Kugelrohr distillation (bp 140° C., 0.3 torr; 0.040 kPa) afforded 9.7 g of amide of 79% purity.

A solution of the amide (2.79 g, 10.8 mmole) in THF (15 mL) was added via syringe over a period of about 1 hour to a solution of LiAlH$_4$ (11 mL, 1M solution in THF, 11 mmole) heated to 63° C. in an oven-dried, nitrogen-purged flask. After the addition had been completed, the LiAlH$_4$ was deactivated by careful addition of water (0.47 g), 15% NaOH (0.47 g) and water (1.28 g). Removal of the resulting solids by vacuum filtration and distillation of the filtrate afforded TMHADETA (bp 120° C., 0.33 torr; 0.044 kPa). The product was identified by nuclear magnetic resonance and mass spectrometry.

EXAMPLE 5

N-(4-Hydroxybutyl)-N,N',N'',N''-tetramethyldiethylenetriamine Me$_4$DETA-HBA

Into a 2 liter stainless steel autoclave was placed 20 g of 5% palladium on carbon (50% water wet) and 206.0 g (2.0 moles) of diethylenetriamine (DETA). The reaction vessel was sealed and purged with nitrogen then hydrogen. The contents of the reaction vessel were then heated to 90° C. and the pressure adjusted to 55 bar with hydrogen. 4-Hydroxybutanal, generated in situ from 46.1 g (0.4 moles) of 2-ethoxytetrahydrofuran in 100 g of water containing 0.6 g of sulfuric acid, was then pumped in the reaction vessel over a period of 2.5 hours. The reaction was allowed to proceed an additional 36 hrs. The hydrogen pressure was maintained at 55 bar throughout the reaction by admission of hydrogen from a 3.79 liter ballast on demand from a dome regulator. Analysis by GC/FID on a sample from the reactor verified that the reductive alkylation with 4-hydroxybutanal was complete.

A 37% aqueous solution of formaldehyde was then pumped into the reaction vessel at 4 g/min. until a total of 758 g (9.34 moles) of formaldehyde had been added. Following the formaldehyde addition, the hydrogen uptake ceased immediately. The product mixture was then cooled and removed from the reactor and then filtered to remove the catalyst. The filtered crude product (1077 g) was partially evaporated at 65 millibar to remove water and then distilled through a packed distillation column with 36 theoretical plates. 224 g of 99.7% pure N,N,N',N',N''-pentamethyldiethylenetriamine was recovered at 68°–72° C. at 6.6 millibar. A 15.3 g transition cut was then taken at 59°–91° C. and 3 millibar which contained mostly the by-product isomers of N-formyltetramethyldiethylenetriamine. A second 13.5 g transition cut was taken at 91°–117° C. and 3 millibars which contained 65% Me$_4$DETA-HBA in addition to the isomeric amides. Finally, a 37.2 g cut taken at 118° C. and 13 millibars contained Me$_4$DETA-HBA of 95.1% purity by GC/FID. The ratio of the Me$_4$DETA-HBA isomers where the hydroxybutyl groups is on a terminal nitrogen versus the internal nitrogen was 10.2:1.

EXAMPLE 6

N-(4-Hydroxybutyl)-N,N',N'',N''-tetramethyldiethylenetriamine and N-(3-Hydroxy-2-methylpropyl)-N,N',N'',N''-tetramethyldiethylenetriamine Me$_4$DETA-HBA and Me$_4$DETA-HMPA Into a 1 liter stainless steel autoclave was placed 50 g of 5% palladium on carbon (50% water wet) and 300.6 g of DETA. The reaction vessel was sealed and purged with nitrogen then hydrogen. The contents of the reaction vessel were heated to 100° C. and the pressure adjusted to 103 bar with hydrogen. Then 200 g of an aqueous solution containing 14.5 wt % of 4-hydroxybutanal and 2.9 wt % of 3-hydroxy-2-methylpropanal (mixture obtained from the hydroformylation of allyl alcohol) was pumped into the reaction vessel over a period of 13 hours. The reaction was allowed to proceed an additional 48 hours. The hydrogen pressure was maintained at 103 bar throughout the reaction by admission of hydrogen from a 3.79 liter ballast on demand from a dome regulator. The reaction vessel was then cooled and vented and the contents filtered through a 0.45 micron fritted stainless steel filter and then the water was removed in vacuo to give 302 g of hydroxyalkylated DETA which was used in the following reductive methylation.

Into a 2 liter stainless steel autoclave was placed 20 g of 5% palladium on carbon (50% water wet) and the hydroxyalkylated DETA mixture. The reaction vessel was sealed and purged with nitrogen then hydrogen. The contents of the vessel were heated to 100° C. and the hydrogen pressure adjusted to 78 bar. Then 714 g of 37 wt % aqueous formaldehyde was pumped continuously to the reaction vessel over a period of 6.5 hours. Hydrogen uptake ceased immediately and the reaction vessel was cooled, vented, and filtered. The filtrate was concentrated in vacuo and finally distilled, first to remove 328 g of N,N,N',N",N"-pentamethyldiethylenetriamine at 9 millibar and 73°–80° C. and then 24 g of hydroxyalkylated tetramethyldiethylenetriamine at 3 millibar and 75°–88° C. This material was analyzed by GC/FID to be 73.8% N-(4-hydroxybutyl)-N,N', N",N"-tetramethyldiethylenetriamine, 17.0% N'-(4-hydroxybutyl)-N,N,N",N"-tetramethyldiethylenetriamine, 9.1% N-(3-hydroxy-2-methylpropyl)-N,N',N",N"-tetramethyldiethylenetriamine, and a trace of N'-(3-hydroxy-2-methylpropyl)-N,N,N",N"-tetramethyldiethylenetriamine.

Comparative Example 1

N-(2-Hydroxypropyl)-N,N',N",N"-tetramethyldiethylenetriamine (Me$_4$DETA-PO)

Diethylenetriamine (1000 g, 9.695 mole) was heated to 60° C. in 1 liter round-bottomed flask. The flask was fitted with a thermometer and a reflux condenser. Propylene oxide (510 mL, 7.288 mole) was added in 25 mole % increments using a pump. The reaction was monitored by GC to maximize the yield of monopropoxylate. The unreacted starting material was removed by distillation at 85° C. head temperature, 2 torr (0.267 kPa). The monopropoxylated product distilled at 125° C. head temperature, 2 torr (0.267 kPa). The monopropoxylated product was an inseparable mixture of terminally and internally monopropoxylated diethylenetriamine in a 4:1 ratio.

Monopropoxylated diethylenetriamine (150 g), palladium on carbon (8.02 g) and water (100 g) were charged to a 1 liter stainless steel autoclave reactor. The reactor was sealed and purged three times with nitrogen, and then three times with hydrogen. The reactor was heated to 80° C. under 50 psi (344.7 kPa) hydrogen. When the temperature reached 80° C., the hydrogen feed was opened bringing the pressure to 800 psi (5516 kPa). An HPLC pump was primed and attached to the reactor. The pump was used to add the formalin reagent (270 g, 37% formaldehyde in water) to the reactor at 3 mL/minute. When the equivalent amount of formaldehyde was added, the hydrogen uptake stopped, indicating the reaction was complete. After the reaction, water was pumped into the reactor to rinse the formaldehyde from the feed lines. The hydrogen feed was shut off and the reactor was cooled. It was then vented and purged with nitrogen. The catalyst was removed by filtering through Celite® filter aid.

Water was removed from the filtrate at atmospheric pressure. Distillation through a one foot (30.5 cm) packed column at a head temperature of 85° C. and pressure of 2 torr (0.267 kPa) afforded the product. The product is an inseparable mixture of the permethylated terminal and internal monopropoxylates in a 78:22 ratio (Me$_4$DETA-PO).

EXAMPLE 7

The relative activities and blow/gel selectivities of the Me$_4$DETA-PO catalyst (Comparative Ex 1) of the prior art, and Me$_4$DETA-HBA (Example 5) were compared using the following procedure:

A general and quantitative technique for measuring catalyst activity and selectivity was used in this example. The rate of isocyanate consumption as a function of time was measured using a formulation containing monofunctional reactants. Reaction samples withdrawn at the indicated times were quenched with dibutylamine and analyzed by liquid chromatography.

Relative catalyst activity can be determined by comparison of the % NCO conversion data. Catalyst selectivity is defined as the ratio of the normalized amount of blowing (urea formation) to the normalized amount of gelling (urethane formation). A selectivity of 1.0 means that the normalized amounts of blowing and gelling are equal at that point in the reaction. A selectivity substantially below 1.0, for example about 0.3, is indicative of a strong gelling catalyst. A selectivity greater than 1.0 is indicative of a strong blowing catalyst. In practice, the function of the blowing catalyst is to counter-balance the activity of a strongly gelling catalyst such as triethylenediamine (TEDA). Thus in practical terms, any catalyst which exhibits a selectivity significantly higher than 0.3 can be used as a blowing catalyst to counterbalance a strong gelling catalyst such as TEDA.

Comparison of Me$_4$DETA-PO with Me$_4$DETA-HBA in Table 1 shows that catalyst activity and blow/gel selectivity improves as the number of carbon atoms between the hydroxyl group and the tertiary nitrogen increases. This type of structural sensitivity has not been previously noted in the prior art and is unexpected.

TABLE 1

| Catalyst | Time (min) | | | | | | | |
|---|---|---|---|---|---|---|---|---|
| | 0.5 | 1.0 | 1.5 | 2.0 | 3.0 | 4.0 | 6.0 | 8.0 |
| Me$_4$DETA-PO | | | | | | | | |
| Conversion | 9.0 | 19.8 | 27.1 | 34.1 | 47.5 | 56.5 | 66.4 | 72.1 |
| (n = 1) Selectivity | 0.72 | 0.77 | 0.79 | 0.79 | 0.79 | 0.77 | 0.76 | 0.78 |
| Me$_4$DETA-HBA | | | | | | | | |
| Conversion | 10.9 | 22.9 | 31.5 | 39.3 | 51.8 | 59.5 | 74.1 | 87.6 |
| (n = 3) Selectivity | 0.86 | 0.91 | 0.91 | 0.90 | 0.88 | 0.86 | 0.83 | 0.74 |

EXAMPLE 8

In this example a polyurethane foam was prepared in a conventional manner. The polyurethane formulation in parts by weight was:

| COMPONENT | PARTS |
|---|---|
| E-648 | 60 |
| E-519 | 40 |
| DC-5043 | 1.5 |
| Diethanolamine | 1.49 |
| Water | 3.5 |
| TDI 80 | 105 Index |

E-648 — a conventional, ethylene oxide tipped polyether polyol marketed by Arco
E-519 — a styrene-acrylonitrile copolymer filled polyether polyol marketed by Arco
DABCO DC-5043 — silicone surfactant marketed by Air Products and Chemicals, Inc.
TDI 80 — a mixture of 80 wt % 2,4-TDI and 20 wt % 2,6-TDI The foam reactivity was measured using 0.5 g of DABCO 33-LV® catalyst (33 wt % triethylenediamine in dipropylene glycol) and either 0.42 g of Me$_4$DETA-PO (Comparative Ex 1; 1.9 mmole) or 0.44 g of Me$_4$DETA-HBA (Ex 5; 1.9 mmole) as catalyst. For each foam, the catalyst (as specified in Table 4) was added to 106.5 g of above premix in a 5" (12.7 cm) diameter by 10" (25.4 cm) tall paper can and the formulation was well mixed for 20 sec. Sufficient TDI 80 was added to make a 105 index foam [index=(mole NCO/mole active hydrogen)×100] and mixed well for 4 sec. The foam was allowed to rise freely, monitoring foam height and carbon dioxide evolution with time. Table 2 sets forth conditions and results.

As these data indicate, the Me$_4$DETA-HBA foam shows more $CO_2$ evolution and greater volume (as indicated by foam height) than the Me$_4$DETA-PO foam. This is consistent with the results given in Table 1, which show that Me$_4$DETA-HBA has greater selectivity for blowing than Me$_4$DETA-PO.

STATEMENT OF INDUSTRIAL APPLICATION

The present invention provides a composition for use as a blowing catalyst in the manufacture of polyurethane foams.

We claim:

1. In a method for preparing a polyurethane foam which comprises reacting an organic polyisocyanate and a polyol in the presence of water as a blowing agent, a cell stabilizer and a catalyst composition, the improvement which comprises employing a catalyst composition consisting essentially of 0 to 50 mole % of a compound of formula I and 50 to 100 mole % of a compound of formula II:

wherein

R is hydrogen, a $C_1$–$C_4$ alkyl, $C_6$–$C_8$ aryl, or $C_7$–$C_9$ aralkyl group; and n is an integer from 2 to 8.

2. The method of claim 1 in which R is hydrogen or an alkyl group.

TABLE 2

| | $CO_2$ evolved (g) | | Foam Height (mm) | |
|---|---|---|---|---|
| Time (sec.) | Me$_4$DETA-PO | Me$_4$DETA-HBA | Me$_4$DETA-PO | Me$_4$DETA-HBA |
| 13 | 36.0 | 48.5 | 4.2 | 6.0 |
| 19 | 52.2 | 63.4 | 7.0 | 8.7 |
| 31 | 70.5 | 76.7 | 10.2 | 11.1 |
| 43 | 77.8 | 82.0 | 11.5 | 12.0 |
| 49 | 80.1 | 83.8 | 11.9 | 12.2 |
| 67 | 84.8 | 86.7 | 12.4 | 12.4 |
| 85 | 86.8 | 88.7 | 12.4 | 12.4 |
| 103 | 88.3 | 90.1 | 12.4 | 12.3 |
| 121 | 89.3 | 90.7 | 12.3 | 12.3 |
| 139 | 90.1 | 91.4 | 12.2 | 12.2 |
| 157 | 90.5 | 91.6 | 12.1 | 12.1 |
| 175 | 90.6 | 92.0 | 12.1 | 12.1 |

3. The method of claim 1 in which R is methyl.

4. The method of claim 1 in which n is 2 or 3.

5. The method of claim 1 in which n is 3.

6. The method of claim 1 in which the catalyst composition consists essentially of 10–25 mole % compound I and 75–90 mole % compound II.

7. The method of claim 1 in which the catalyst composition consists essentially of 15–20 mole % compound I and 80–85 mole % compound II.

8. The method of claim 1 in which R is methyl and n is 3.

9. The method of claim 8 in which the catalyst composition consists essentially of 10–25 mole % compound I and 75–90 mole % compound II.

10. The method of claim 8 in which the catalyst composition consists essentially of 15–20 mole % compound I and 80–85 mole % compound II.

11. The method of claim 1 in which the catalyst composition is in combination with a tertiary amine, organotin or carboxylate urethane catalyst.

12. The method of claim 6 in which the catalyst composition is in combination with a tertiary amine, organotin or carboxylate urethane catalyst.

13. The method of claim 8 in which the catalyst composition is in combination with a tertiary amine, organotin or carboxylate urethane catalyst.

14. In a method for preparing a polyurethane foam which comprises reacting an organic polyisocyanate and a polyol in the presence of water as a blowing agent, a cell stabilizer and a catalyst composition, the improvement which comprises employing a catalyst composition consisting essentially of 0 to 50 mole % of a compound of formula I and 50 to 100 mole % of a compound of formula II:

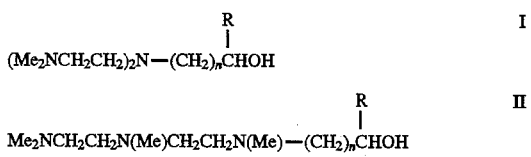

wherein

R in both instances is hydrogen or a $C_1$–$C_4$ alkyl group; and n is an integer from 2 or 3.

15. The method of claim 14 in which the catalyst composition consists essentially of 10–25 mole % compound I and 75–90 mole % compound II.

16. The method of claim 14 in which the catalyst composition is in combination with a tertiary amine, organotin or carboxylate urethane catalyst.

17. The method of claim 15 in which the catalyst composition is in combination with a tertiary amine, organotin or carboxylate urethane catalyst.

18. The method of claim 14 in which the catalyst composition consists essentially of 15–20 mole % compound I and 80–85 mole % compound II and R is methyl.

19. The method of claim 18 in which the catalyst composition is in combination with a tertiary amine, organotin or carboxylate urethane catalyst.

20. The method of claim 14 in which n is 3.

21. The method of claim 15 in which n is 3.

* * * * *